United States Patent [19]

Kidd

[11] Patent Number: 5,002,163

[45] Date of Patent: Mar. 26, 1991

[54] FRICTION WHEEL BRAKE

[75] Inventor: Michael T. Kidd, Delton, Mich.

[73] Assignee: Standex International Corporation, Salem, N.H.

[21] Appl. No.: 393,402

[22] Filed: Aug. 11, 1989

[51] Int. Cl.⁵ ............................................. F16D 63/00
[52] U.S. Cl. ................................. 188/083; 16/35 R; 188/1.12; 188/72.8; 280/33.994; 301/6 E; 301/37 P
[58] Field of Search ...................... 188/83, 1.12, 72.1, 188/71.1, 72.8, 18 A, 264 W, 218 A; 16/35 R, 46; 301/6 R, 6 E, 6 WB, 37 P; 280/33.994; 192/70.15

[56] References Cited

U.S. PATENT DOCUMENTS

| Re. 31,110 | 12/1982 | Black. | |
|---|---|---|---|
| 918,636 | 4/1909 | Young | 16/35 R |
| 2,068,160 | 1/1937 | Zeindler | 16/35 R |
| 2,728,936 | 1/1956 | Hodges et al. | 16/35 R |
| 3,771,628 | 11/1973 | Close. | |
| 3,985,208 | 10/1976 | Libhart | 188/1.12 |
| 4,318,204 | 3/1982 | Black. | |
| 4,336,630 | 6/1982 | Page | 16/35 R |
| 4,874,064 | 10/1989 | Oono | 192/70.15 X |

FOREIGN PATENT DOCUMENTS

| 1203621 | 10/1965 | Fed. Rep. of Germany | 188/732 |
|---|---|---|---|
| 773603 | 11/1934 | France | 16/35 R |
| 1461474 | 11/1966 | France | 16/35 R |
| 159632 | 1/1933 | Switzerland | 16/35 R |

Primary Examiner—George E. A. Halvosa
Attorney, Agent, or Firm—Flynn, Thiel, Boutell & Tanis

[57] ABSTRACT

A friction braking mechanism for a merchandise cart or the like for holding objects includes a frame for supporting the container, and a plurality of wheels rotatably supported on the frame. The wheels are supported for rotation relative to the frame about a rotational axis. At least one of the wheels has a thread guard associated therewith and secured against rotation therewith. An arrangement which is continuously operable during rotation of the wheel coacts between the wheel and the thread guard for frictionally retarding rotation of the wheel. An adjustment arrangement is also provided for adjusting the amount by which the rotation of the wheel is frictionally retarded.

13 Claims, 2 Drawing Sheets

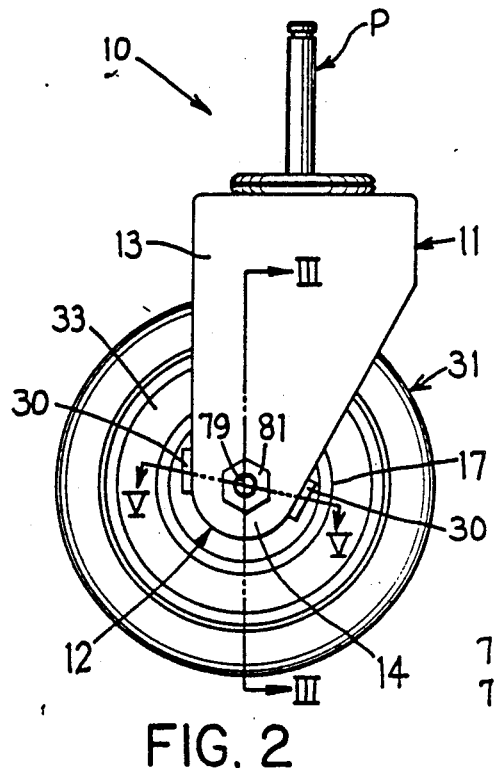
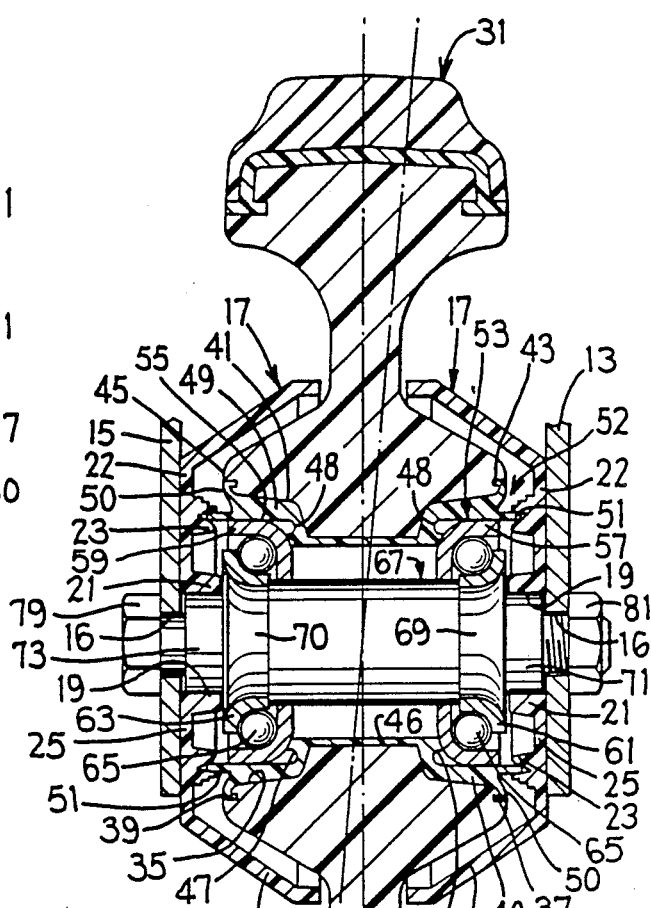
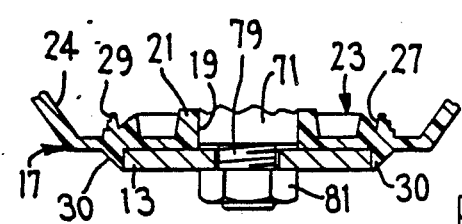
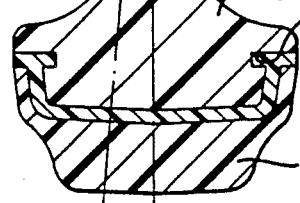
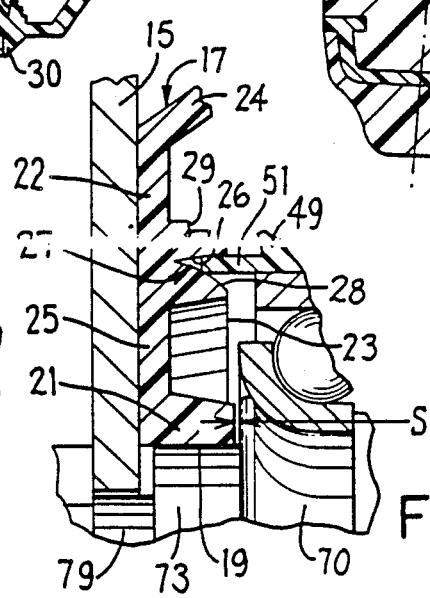
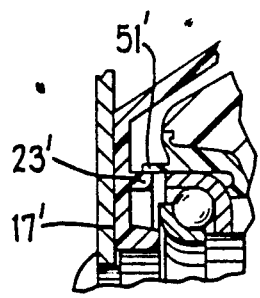
FIG. 2
FIG. 5
FIG. 6 PRIOR ART
FIG. 3
FIG. 4

FRICTION WHEEL BRAKE

FIELD OF THE INVENTION

The invention relates to a wheel braking apparatus for use on merchandise carts or the like and, more particularly, to a wheel brake apparatus which continuously frictionally retards the rotation of the wheel to prevent unwanted rotation thereof.

BACKGROUND OF THE INVENTION

The risk of damage to property or injury to persons due to collisions of persons or property with merchandise carts or the like travelling at excessive speeds has long been recognized. This risk is especially prevalent when such merchandise carts are used by customers of supermarkets and other retail stores to transport their purchases across the parking lot to their automobile. Due to prevailing construction practices, terrain, or for purposes of drainage, such supermarket and retail store parking lots are often constructed on an incline. If a person accidentally loses control of a cart full of groceries or other merchandise, the cart can gain considerable speed and momentum travelling down such an incline. Furthermore, even when a customer successfully unloads the cart safely, the danger remains, because quite frequently the cart is left in the parking lot at the location where it was unloaded. The unattended cart may then begin to roll down the incline, or even be blown by the wind. The danger of a collision of such a runaway cart, whether loaded or unloaded, with an automobile parked in the parking lot or a person walking in the parking lot is apparent.

A number of wheel brakes have been proposed to deal with such problems. Many conventional brake mechanisms have required the customer to manually operate a hand brake. However, such manual brakes are inconvenient, and the customer cannot always be relied upon to set the brake when the cart is left on the lot after unloading.

U.S. Pat. No. 3 771 628 addresses some of these problems, by providing a brake mechanism which automatically engages when the speed of the cart exceeds a predetermined maximum. After the brake engages, rotation of the wheel is retarded until the cart is gradually brought to a halt. This device frees the customer from the inconvenience of using the hand brake, and also provides for gradually stopping a runaway cart which exceeds the predetermined maximum speed. However, such a speed responsive wheel retarder has the following problems. If the maximum speed of the cart is set too high, a runaway cart may well travel a great distance down the incline before it gathers enough speed to engage the wheel retarding mechanism. Having travelled such a great distance, the cart is likely to be near automobiles or persons in the parking lot before the wheel retarding mechanism engages. Because the wheel retarding mechanism in the above-mentioned patent only brings the cart to a gradual stop, it may not be able to stop the cart before a collision occurs. Even if the cart, upon reaching such a high speed, has not drawn near persons or automobiles, a collision may not be avoidable because gradual braking requires more distance to effect a stop when speeds are high. It is therefore desirable to provide a wheel brake means which will allow customers to make any reasonable use of the cart, and which acts continuously to prevent the wheels from achieving an undesirably high rotational speed, thereby avoiding the problem of high speed braking.

Accordingly, the objects of the invention include:

1. To provide a friction wheel brake which continuously acts to prevent a wheel from achieving an undesirably high rotational speed;
2. To provide a friction wheel brake, as aforesaid, which does not interfere with any reasonable use of a merchandise cart;
3. To provide a friction wheel brake, as aforesaid, which is easily adjustable to varying braking forces; and
4. To provide a friction wheel brake, as aforesaid, which is inexpensive and durable.

SUMMARY OF THE INVENTION

The objects and purposes of the invention, including those set forth above, are met by providing a friction wheel brake which includes a frame and at least one wheel rotatably supported on the frame for relative rotation with the frame about a rotational axis. The wheel has a thread guard associated therewith, the thread guard being secured to the frame against rotation with the wheel. An adjustable arrangement coacting between the wheel and the thread guard is continuously operable during rotation of the wheel for frictionally retarding rotation of the wheel.

BRIEF DESCRIPTION OF THE DRAWINGS

A preferred embodiment of the present invention is described hereinafter with reference to the enclosed drawings, in which:

FIG. 2 is an elevational view of a caster, indicated by II in FIG. 1, embodying the inventive friction braking mechanism;

FIG. 3 is a sectional view taken along the line III—III of FIG. 2;

FIG. 4 is an enlarged fragmentary view of a portion of FIG. 3;

FIG. 5 is a fragmentary sectional view taken along the line V—V in FIG. 2;

FIG. 6 is a view generally similar to FIG. 4 showing a prior art wheel structure;

Certain terminology will be used in the following description for convenience in reference only and will not be limiting. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

Figure 1:
FIG. 1 is a diagrammatic illustration of a merchandise cart on which the friction wheel brake disclosed herein may be used.

FIG. 1 diagrammatically illustrates an example of a conventional merchandise cart C on the wheels W of which the inventive friction wheel brake is preferably used. While the wheels W are, in FIG. 1, shown to be the front swivelable casters, it is to be understood that the invention could instead be employed on the rear fixed wheel of the cart.

Referring to FIGS. 2 and 3, a caster 10 embodying the present invention includes a U-shaped frame 11 having a pair of parallel legs 13 and 15 connected by a bight portion (not shown). The legs 13 and 15 extend away from the bight portion parallel to each other. The legs 13 and 15 taper in width as they extend away from the bight portion. The ends 12 of legs 13 and 15 are semi-circular, forming substantially U-shaped end portions 14. Each end portion 14 has formed therein a circularly or polygonally shaped hole 16 concentric with the semi-circular ends 12. The bight portion of the frame 11 is attached to a merchandise cart or hand truck or the like (as shown in FIG. 1) by a pin P extending therefrom.

Preferably identical axially spaced annular thread guards 17 are coaxially arranged and face axially inward toward each other in mirror-image fashion. The thread guards 17 are each provided at their center with structure defining a circular hole 19, which structure includes an annular flange 21 concentric with the hole 19 and projecting axially inwardly therefrom. An axially inwardly extending annular seal lip 23 is formed on the thread guard 17 at a location radially outwardly spaced from the annular flange 21. A generally flat portion 25 extends radially between the annular flange 21 and the annular seal lip 23. A radially extending annular flange 22 extends outwardly from the seal lip 23 and terminates in an axially inwardly extending annular portion 24.

Referring to FIG. 4, the annular seal lip 23 includes, at a radially central portion thereof, an annular, generally V-shaped, axially inwardly opening groove 27. A radially outwardly extending surface 26 of the V-shaped groove is substantially flat, and its radially inwardly extending surface 28 defines a convex curve. A series of successively radially outwardly projecting steps 29 is formed on the radially outer portion of the annular seal lip 23 between the V-shaped groove 27 and the annular flange 22. As shown in FIG. 6, the prior art seal lip 23', disclosed in U.S. Pat. No. 4 318 204, does not include a groove or a stepped portion.

A pair of axially projecting ridges or ribs 30 project from the axially outer surfaces of the thread guards 17, as shown in FIGS. 2 and 5. The ridges 30 are spaced symmetrically about the hole 19 and converge slightly toward each other so as to receive therebetween the tapered edges of the legs 13 and 15 of the U-shaped frame 11, which legs bear against the outer axial surfaces of the respective thread guards 17. The ridges 30 have a substantially right triangular cross-section (FIG. 5) and the surfaces thereof which face the opening 19 are approximately perpendicular to the surface from which they project.

Referring to FIG. 3, a conventional wheel 31, as also shown in U.S. Pat. No. 4 318 204, includes a hub 33 with a central opening 35 therein. The hub 33, in this embodiment, has generally an hour glass cross sectional shape from the outside diameter of the opening 35 radially outwardly to the periphery of the hub. As a result, a pair of oppositely facing annular recesses 33A and 33B, which receive the respective axially inwardly extending annular portions 24 of the thread guards 17, are provided in the opposite axially facing sides of the hub. The opening 35 is concentric with the outer diameter of the hub 33. A pair of annular grooves 37 and 39 are formed in respective opposite axial faces of the hub 33 so as to surround the opening 35 in close proximity thereto.

A bearing assembly 52, also conventional, is mounted in the opening 35. A liner 41 is fixedly secured to the internal surface of the central opening 35 by effecting a gripping of a pair of axially spaced annular ribs 43 and 45 in the annular grooves 37 and 39, respectively. More specifically, the liner has a central segment 46 with a pair of axially outwardly facing beads 47 formed on the axial ends thereof. Radially outwardly extending wall segments 48 are integrally connected to the respective beads 47. Relatively thick elastic wall segments 49 extend axially from the radially extending wall segments 48. Further radially extending wall segments 50 extend from the thick wall segments 49 and terminate in the aforesaid annular ribs 43 and 45. Annular bearing walls 51 having substantially parallel inner and outer radial surfaces extend axially away from the thick wall segments 49 into the annular V-shaped grooves 27 in the seal lips 23 of the thread guards 17 for snug frictional engagement with the surfaces 26 and 28. As shown in FIG. 6, the prior art wall 51' engages the lip 23 on only one radial surface. The snug engagement of the bearing walls 51 with the surfaces 26 and 28 also provides a seal against entry of dust into the bearing assembly 52.

The material of the liner 41 is preferably an elastically deformable resilient material, such as polyurethane having a hardness value in the range of 75 Shore A to 55 Shore D Durometer.

The bearing assembly 52 includes bearings 53 and 55 having axially spaced outer races 57 and 59, and axially spaced inner races 61 and 63, respectively, with a plurality of bearing balls 65 therebetween. The outer races 57 and 59 bear against the thick wall segments 49 of the liner 41.

The wheel 31 is rotatably supported on an open ended hollow cylindrical axle 67 by means of the bearing assembly 52. The axle 67 extends through the bearing assembly 52 and has a pair of axially spaced shoulders 69 and 70 which bear against the inner races 61 and 63, respectively, and a pair of axial end portions 71 and 73 of reduced outside diameter which extend axially beyond the hub 33. The end portions 71 and 73 are received in the holes 19 of the thread guards 17 such that the annular flanges 21 are adjacent and slightly axially spaced from the axial end faces of the shoulders 69 and 70, and the thread guards each oppose an axially facing side of the hub 33.

As stated above, the axle 67, liner 41, bearing assembly 52 and hub 33 are conventional and are preferably substantially identical to that disclosed in U.S. Pat. No. 4 318 204, the disclosure of which is incorporated herein by reference. It will be recognized, however, that other axle and bearing arrangements could be utilized and, therefore, the invention is not to be limited to the disclosed embodiment.

The radial periphery of the hub 33 defines a tread mounting surface. A moldable synthetic resin tread material, particularly polyurethane, defines a tread 75. The tread material extends around the periphery of the hub 33 and also into axially opening annular grooves 77 provided in the hub 33.

With the annular flanges 21 of the thread guards 17 snugly sleeved on the reduced diameter axial end portions 71 and 73 of the axle 67, the legs 13 and 15 of the frame 11 can then be placed adjacent the thread guards 17 so that the holes 16 in the legs 13 and 15 are coaxially aligned with the holes 19 of the thread guards 17, and the legs 13 and 15 are slidably received between the ridges 30, whereby the thread guards 17 are fixed against rotation relative to the frame 11. A bolt 79 is inserted through the hollow axle 67 and the sets of coaxially aligned openings 16 and 19 of the frame 11 and thread guards 17, respectively, so that the axle 67 is mounted upon the legs 13 and 15 of the frame 11. A nut 81 is applied to the threaded end of the bolt 79 in order to prevent removal of the bolt from the frame 11.

OPERATION

The embodiment shown in FIGS. 2-4 operates in the following manner. With the nut 81 snugly applied to the bolt 79, the bearing walls 51 of the liner 41 are snugly received into the V-shaped grooves 27 of the respective thread guards 17. That is, the legs 13 and 15 are squeezed axially between the nut 81 and the head of the bolt 79, whereby the legs and the thread guards 17 are pressed axially closer toward the wheel hub 33. Thus, the bearing walls 51 are compressed axially into the grooves 27. Since the thread guards 17 are rotationally fast with the frame 11, as the wheel 31 rotates, due to the compression of the bearing walls 51 into the grooves 27, the inner and outer radial surfaces of the bearing walls 51 respectively frictionally engage the convex and flat surfaces 28 and 26 inside of the grooves 27. The axially outer edges of the bearing walls 51 engage both surfaces 26 and 28 inside of the grooves 27. Accordingly, the engaged bearing walls 51 and groove surfaces 26 and 28 frictionally resist relative rotation between the rotatable wheel 31 and the fixed thread guards 17, thereby retarding movement of the attached cart. The friction wheel brake is preferably employed in the front pair of swivel casters of a cart, but such preferred use is not to be limiting.

The amount of frictional braking applied by the bearing walls 51 is adjustable by simply tightening or loosening the nut 81 to respectively increase or decrease the amount of compressive force applied between the nut 81 and the bolt head, to thereby adjust the frictional braking force applied between the bearing walls 51 and the seal lips 23. The nut 81 is initially tightened such that a desired amount of torque must be applied to the wheel 31 to rotate it. The following test results show the minimum breakaway force (in pounds) required to start rolling a shopping cart equipped with the disclosed friction brake, and the minimum angle (in degrees) of slope of a hill required to start the cart rolling on its own, for various torque settings of the friction brake (inch-pounds required to rotate the wheel). A standard 50 pound shopping cart was used for the test.

| Wheel Torque Setting | Breakaway To Start Rolling | Degree of Slope To Start Rolling |
| --- | --- | --- |
| 0 in. lbs. | 1 lbs. | 2.0° |
| 5 in. lbs. | 4.9 lbs. | 4.8° |
| 10 in. lbs. | 8.25 lbs. | 9.4° |
| 15 in. lbs. | 11.55 lbs. | 11.2° |

The thread guards 17 are preferably constructed such that the annular flanges 21 thereof are spaced from the axle shoulders 69 and 70 (see S in FIG. 4) when the bearing walls 51 are pressed against the groove surfaces 26 and 28 tightly enough to yield the desired initial torque setting. The reason for the spacing S should be apparent from the immediately following discussion. The bearing walls 51 are subject to frictional wear determined by how tightly the walls 51 are compressed against the lips 23, and the amount of use of the wheel 31. The thread guards 17 are preferably made from a compressible nylon or the like wear-resistant material, particularly Zytel 101, available from Dupont Co., located at Wilmington, Delaware, to reduce their susceptibility to frictional wear. However, since the bearing walls 51 are gradually worn away so as to be axially shortened by the frictional engagement with the groove surfaces 26 and 28, it becomes necessary, from time to time, to adjust the position of the bearing walls 51 axially in the grooves 27, in order to maintain the desired torque setting. By tightening the nut 81, the legs 13 and 15 are squeezed between the nut 81 and the head of the bolt 79, causing the legs and the thread guards 17 to be pressed even closer toward the wheel hub 33. Thus, when the nut 81 has been tightened by an appropriate amount, the bearing walls 51 project axially into the grooves 27 to substantially the same compressed position of frictional engagement with the grooves 26 and 28 as before the frictional wear occurred. Accordingly, because the hub 33 and the thread guards 17 must be moved closer together to compensate for frictional wear and axial shortening of the bearing walls 51 and still maintain the desired torque setting, the initial spacing S between the annular flanges 21 of the thread guards 17 and the axial end faces of the respective axle shoulders 69 and 70 is provided in order to permit such movement of the thread guards 17 closer to the hub 33. Periodic adjustment, for example at six month intervals, may preferably be performed.

The thread guards 17 are easily replaced on site by simply removing the nut 81 and bolt 79 to disconnect the thread guards 17 from the frame 11 and the hub 33. Accordingly, if the groove surfaces 26 and 28 in the seal lip 23 become badly worn, the entire thread guard 17 is easily replaced without returning the cart to the manufacturer. The same holds true for wear of the bearing walls 51, that is, a new wheel with fresh bearing walls can be provided.

ALTERNATE EMBODIMENT

Figure 7:
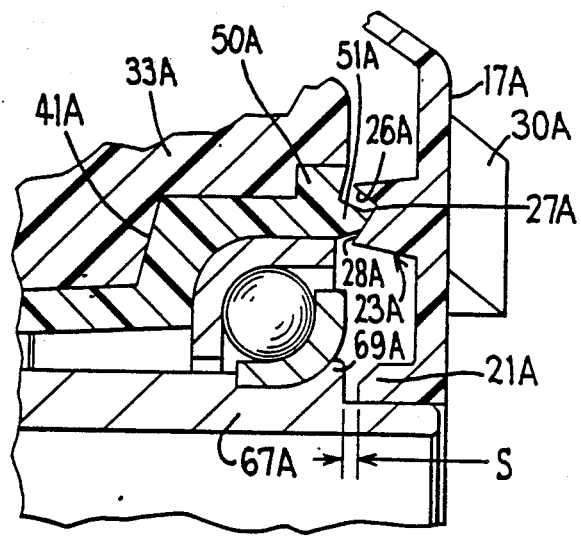
FIG. 7 is an enlarged fragmentary view of an alternate embodiment of a portion of FIG. 3.
Figure 8:
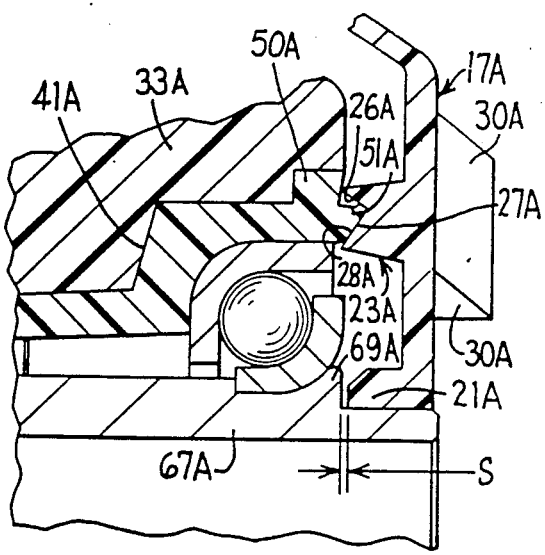
FIG. 8 is a view generally similar to FIG. 7, but with the friction brake in a different position of engagement.
Figure 9:
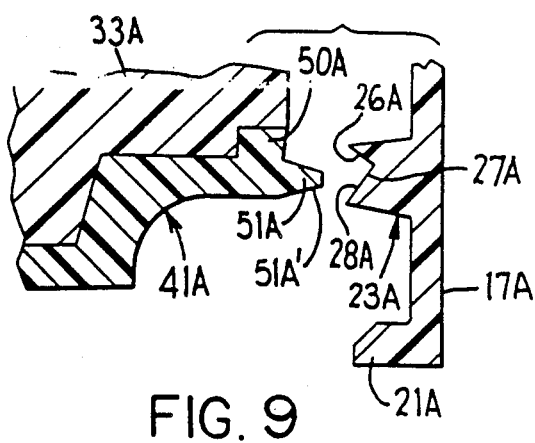
FIG. 9 is an exploded view generally similar to FIGS. 7 and 8.

FIGS. 7-9 disclose an alternate embodiment of the bearing wall 51 and seal lip 23. For convenience of reference, features analogous to those disclosed in FIG. 4 are designated by the same numeral, but with the suffix "A" added thereto.

FIG. 9 depicts a bearing wall 51A and seal lip 23A just prior to assembly. The axially inwardly opening annular groove 27A in the seal lip 23A has an asymmetric V-shape, including axially outwardly converging, flat side surfaces 26A and 28A which meet to form the vertex of the V in the radially outer half of the seal lip 23A. That is, the radially inner side surface 28A of the groove 27A is more steeply sloped relative to the axial direction of the wheel than is the radially outer side surface 26A. The axially extending annular bearing wall 51A is somewhat thicker than the bearing wall 51 of FIG. 9, having sides which converge axially outwardly to a substantially flat axially outer edge. The bearing wall 51A is, due to its increased thickness, somewhat stiffer than the bearing wall 51 of FIG. 4. Also, since its cross-sectional area, as viewed in the axial direction, increases as its sides diverge axially inwardly, the bearing wall 51A presents a progressively larger surface for engagement with the groove surfaces 26A and 28A as it is axially worn away by friction.

FIG. 7 shows the annular bearing wall 51A compressed into the groove 27A and elastically deformed such that part of its peripheral surface 51A' is engaged along the radially inner side surface 28A. In the position of FIG. 7, the bearing wall 51A is engaged only with the radially inner side surface 28A of the groove 27A. Due to the resilience of the material of the liner 41, the bearing wall 51A urges against the groove surface 28A.

FIG. 8 shows the bearing wall 51A compressed into the groove 27A by a greater compressive force than that shown in FIG. 7. That is, the nut 81 has been tightened still further in FIG. 8. The bearing wall 51A is elastically deformed such that its surface 51A' engages substantially the entire length of the radially inner surface 28A of the groove 27A as well as a portion of the radially outer surface 26A thereof adjacent the vertex of the V. Thus, the groove surfaces 26A and 28A serve to retain the elastically deformed bearing wall 51A by limiting the amount of space available for deformation. Therefore the bearing wall 51A is confined to elastically deform within the space defined by the surfaces 26A and 28A. This tends to maximize the area of the surface 51A' in frictional engagement with the groove surfaces 26A and 28A. Therefore, increased frictional retarding of wheel rotation is caused not only by increased compression of the bearing wall 51A against the groove surfaces 26A and 28A, but also by the increased surface area of frictional engagement caused by such increased compression.

The spacing S between the end face of the axle shoulder 69A and the thread guard flange 21A is reduced in FIG. 8 as compared to FIG. 7, due to the further pressing of the thread guard 17A toward the wheel hub 33A. The compression shown in FIG. 8 is such that the radially outer edge of the seal lip 23A axially abuts the radially extending wall segment 50A of the liner 41A.

Since the frictional braking force is continuously applied in the disclosed embodiments, shopping carts equipped therewith can be prevented from rolling except when an external force great enough to overcome the frictional braking force (that is, when enough torque to overcome the torque setting) is applied. Accordingly, for example, the frictional braking force may be adjusted so that the cart can easily be moved by a shopper but will not begin to roll when left standing on an incline. Obviously, the braking force is easily adjustable as necessary to many different levels.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A frictional brake mechanism for a rotatable wheel, comprising:
   frame means;
   a wheel rotatably supported on said frame means, said wheel being supported for rotation relative to said frame means about a rotational axis;
   an annular thread guard disposed axially alongside and concentrically with said wheel and secured to said frame means and against rotation, said thread guard having a radially outer portion which includes an axially inwardly extending annular flange means having a free edge which is closely adjacent but slightly axially spaced from said wheel for preventing entry or foreign objects from radially outside said thread guard into a space defined axially between said thread guard and said wheel; and
   braking means operable continuously during rotation of said wheel and coacting between said wheel and said thread guard for frictionally retarding rotation of said wheel, said braking means being located radially inwardly of said annular flange means, said braking means including adjustment means for supporting said thread guard for axial movement relative to said wheel and facilitating an adjustment of an amount by which the rotation of said wheel is frictionally retarded and without causing said annular flange means to engage said wheel.

2. The apparatus according to claim 1, wherein said braking means further includes one of said wheel and said thread guard having a projection thereon, the other of said wheel and said thread guard having means defining a groove therein for snugly receiving said projection, said projection and said groove being frictionally engaged during rotation of said wheel.

3. The apparatus according to claim 2, wherein said adjustment means includes means for facilitating incrementally forcibly pressing said projection into said groove for frictional engagement with said groove defining means and for facilitating incrementally releasing said projection from said compressed frictional engagement with said groove defining means.

4. The apparatus according to claim 3, wherein said projection extends in a first direction and said groove opens in a second direction substantially opposite said first direction, said first and second directions being substantially parallel to said rotational axis of said wheel, said projection and said groove being generally annular and concentric about said rotational axis, said groove completely surrounding said rotational axis, said projection extending around said rotational axis for a predetermined distance.

5. The apparatus according to claim 4, wherein said pressing and releasing facilitating means includes said wheel having a circular central opening extending axially therethrough and centered around said rotational axis, a hollow axle fitted in said central opening and having open axial ends, said wheel being rotatably supported on said axle, elongate fastening means fitted in and extending through said hollow axle for securing said axle to said frame means with said frame means axially alongside said wheel, said thread guard being interposed between said frame means and said wheel.

6. The apparatus according to claim 5, wherein said elongate fastening means includes means for facilitating incremental axial displacement of said frame toward said wheel, whereby said thread guard is compressed between said frame and said wheel and said projection is pressed into frictional engagement with said groove defining means.

7. The apparatus according to claim 2, wherein said thread guard includes an axially projecting annular lip having said groove defining means therein, said annular lip projecting from said thread guard toward said projection in opposed relationship thereto, said projection extending from said wheel into said groove and axially overlapping no more than approximately onehalf of said lip.

8. In a wheel assembly for use with a merchandise cart or the like, including a wheel having a central opening therein, a hollow axle having open axial ends and disposed in said central opening, said wheel being supported on said axle for rotation about a rotational axis, said axle having axially spaced, radially enlarged shoulder portions and reduced diameter axial end portions, said end portions extending from axial end faces of said shoulder portions and axially beyond said wheel, at least one annular thread guard disposed axially alongside said wheel and having an axially extending annular flange surrounding a central opening into which one of said reduced diameter axial end portions is fitted, and means for securing said annular flange axially adjacent one of said axial end faces of said shoulders, the improvement comprising:

one of said wheel and said at least one thread guard having an axially extending projection thereon, the other of said wheel and said at least one thread guard having means defining an axially opening groove therein for snugly receiving said projection for frictional engagement therebetween; and means for facilitating adjustably forcibly pressing said projection into said groove for frictional engagement with said groove defining means and for facilitating adjustably releasing said projection from compressed frictional engagement with said groove defining means, and said axially extending annular flange of said thread guard being supported for axial movement on said axle and being axially spaced slightly from said one axial end face of said shoulders for permitting relative movement of said thread guard toward said wheel to accommodate said forcible pressing of said projection into said groove.

9. The apparatus according to claim 8, wherein said projection extends in a first direction and said groove opens in a second direction substantially opposite said first direction, said first and second directions being substantially parallel to said rotational axis, said projection and said groove being generally annular and concentric about said rotational axis, said groove completely surrounding said rotational axis, said projection extending around said rotational axis for a predetermined distance.

10. The apparatus according to claim 9, including an axially extending annular lip formed on one of said wheel and said thread guard, said lip including said groove defining means, said groove being substantially V-shaped.

11. The apparatus according to claim 10, wherein said pressing and releasing facilitating means includes a threaded fastener fitted in and extending through said hollow axle so as to be reciprocally axially movable therein, said threaded fastener having at least one radial protrusion thereon for pushing said thread guard axially toward said wheel.

12. The apparatus according to claim 11, wherein said lip is formed on said thread guard, said projection being on said wheel.

13. The apparatus according to claim 12, wherein said lip has a radially outer portion which has a series of steps formed thereon, said groove defining means including a convexly curved radially inner wall and a substantially straight radially outer wall.

* * * * *